United States Patent [19]
Johansen et al.

[11] Patent Number: 5,771,927
[45] Date of Patent: Jun. 30, 1998

[54] UNDERSEA HYDRAULIC CONNECTOR WITH EQUALIZATION CHANNEL

[75] Inventors: John A. Johansen, Houston; Timothy R. Goggans, Cypress, both of Tex.

[73] Assignee: Kongsberg Offshore A.S., Kongsberg, Norway

[21] Appl. No.: 740,059

[22] Filed: Oct. 24, 1996

[51] Int. Cl.⁶ .................................................. F16L 37/28
[52] U.S. Cl. ..................... 137/614.04; 137/614; 251/282
[58] Field of Search ..................... 137/614.04, 614.93, 137/614; 251/282

[56] References Cited

U.S. PATENT DOCUMENTS

| | | | |
|---|---|---|---|
| 4,694,859 | 9/1987 | Smith, III | 137/614.04 |
| 4,702,209 | 10/1987 | Sausner et al. | 251/282 X |
| 4,709,726 | 12/1987 | Fitzgibbons | 137/614.04 |
| 4,768,538 | 9/1988 | Mintz et al. | 137/15 |
| 4,813,454 | 3/1989 | Smith, III | 137/614.04 |
| 4,884,584 | 12/1989 | Smith | 137/614.04 |
| 4,900,071 | 2/1990 | Smith, III | 285/379 |
| 5,052,439 | 10/1991 | Smith, III | 137/614.04 |
| 5,099,882 | 3/1992 | Smith, III | 137/614.04 |
| 5,203,374 | 4/1993 | Smith, III | 137/614.04 |
| 5,232,021 | 8/1993 | Smith | 137/614.04 |
| 5,339,861 | 8/1994 | Smith, III | 137/614.04 |
| 5,343,891 | 9/1994 | Bosley | 137/614.04 |
| 5,355,909 | 10/1994 | Smith, III | 137/614.04 |
| 5,368,070 | 11/1994 | Bosley | 137/614.04 |
| 5,390,702 | 2/1995 | Smith, III | 137/614.04 |
| 5,469,887 | 11/1995 | Smith, III | 137/614.04 |
| 5,479,960 | 1/1996 | Kirkman | 137/614.04 |

*Primary Examiner*—Kevin Lee
*Attorney, Agent, or Firm*—Henry C. Query, Jr.

[57] ABSTRACT

An undersea hydraulic coupling includes a pair of interconnectable male and female members where each of the members includes a body portion and a fluid valve disposed within the body portion. The male and female members cooperate with the fluid valves to actuate the valves such that the valves are placed in either an open position or a closed position to control fluid flow therebetween. The female member has a receiving chamber for receiving the male member, and a longitudinal axis defining a direction of engagement and disengagement between the male and female members. The undersea connector includes at least one annular seal in the receiving chamber for engaging the male member in sealed cooperation with the female member when the male member is received within the receiving chamber. Additionally, a plurality of vacuum relief channels are disposed in the annular seal that permit fluid surrounding the male and female members to pass through the vacuum relief channels to equalize pressure between the receiving chamber and the fluid surrounding the male and female members during engagement and disengagement of the male and female members.

20 Claims, 4 Drawing Sheets

UNDERSEA HYDRAULIC CONNECTOR WITH EQUALIZATION CHANNEL

BACKGROUND OF THE INVENTION

The present invention relates generally to hydraulic couplings used in undersea drilling and production applications and seals used in those couplings, and more specifically to a resilient annular seal having vacuum relief channels to equalize pressure within the connector and prevent seal implosion upon disconnection of the male connector from the female connector.

Undersea hydraulic couplings are well known in the art. Typical couplings generally consist of a male and a female member with seals positioned within the female member to seal the junction between the male and female members. The female member generally has a cylindrical body with a relatively large diameter longitudinal bore at one end and a relatively small diameter longitudinal bore at the other end. The small diameter bore facilitates connection to hydraulic or other fluid lines, while the large diameter bore contains the seals and receives the male portion of the coupling. The male member typically includes a cylindrical portion or probe at one end having a diameter approximately equal to the inside diameter of the large bore in the female portion of the coupling. The male member also includes a connection at its other end to facilitate connection to corresponding hydraulic or other fluid lines. When the cylindrical portion of the male member is inserted into the large bore of the female member, the seals, often resembling O-rings, either abut the end or face of the male member or engage the cylindrical probe wall about its circumference. The hydraulic fluid is then free to flow through the female and male portions of the coupling while the seals prevent the flow of hydraulic fluid from escaping about the joint and the coupling. In some instances, a check valve may be installed in the male and female members. Each check valve opens when the coupling engages and closes when the coupling is broken so as to prevent fluid from leaking out of the system.

Such known connectors have significant problems. The first problem arises during connection of the male member to the female member. When the female member is subsea or underwater, the large diameter bore of the female member becomes filled with seawater. Upon connection of the male member, the trapped seawater is forced into the hydraulic system through both members of the coupling and contaminates the hydraulic fluid.

The second problem arises during disconnection of the coupling members. When the male member is withdrawn from the large central bore of the female member, a resulting low pressure area or vacuum relative to the high external pressure at deep waters is created within the bore. When the end face of the male member passes the midpoint of the elastomeric seal in the bore of the female member, the seal no longer has the outer wall of the male member to help retain the seal in its groove. The force of the vacuum may deform or extrude the seal, causing leakage, or worse, may implode the seal out of the groove and into the annulus between the male and female members. The vacuum force also increases the difficulty of disengaging the male member from the female member. The resistance to disengagement due to the vacuum is magnified when multiple couplings on a manifold plate are disengaged at the same time.

SUMMARY OF THE INVENTION

The disadvantages of present undersea connectors are substantially overcome with the present invention by providing a novel undersea hydraulic connector incorporating partial pressure equalization.

The novel undersea connector includes vacuum relief channels disposed along an inside circumference of a resilient seal element to permit seawater to enter a receiving chamber of the female connector as the male connector is withdrawn. This permits pressure within the receiving chamber to be equalized with the ambient pressure as the male connector is withdrawn. Without such pressure equalization, known seals tend to implode or otherwise become deformed and unseated when high vacuum levels are created. Because of the vacuum relief channels, the present undersea connector may be used in repeated connect and disconnect deep-sea operations without replacement of the seals or other components. This is extremely advantageous since replacement of the connector in a deep sea environment may be impossible, or at best, extremely costly and dangerous. The equalization of pressure within the receiving chamber also reduces the amount of force required to disengage the male connector from the female connector.

During engagement of the male and female connectors, a small volume of seawater tends to become trapped within the receiving chamber since it is exposed to the external undersea environment. During engagement of the connectors, known connectors cause the trapped seawater to be injected into the hydraulic or system lines, which may contaminate the system fluids. The novel vacuum relief channels in the seal of the present invention permit a portion of the trapped seawater to be ejected from the receiving chamber during insertion of the male connector while still maintaining a tight engaging seal between the male and female connectors.

Ease of manufacturing and production costs are significant factors. Known connectors that require drilling or milling of metal parts are expensive to produce. The cost of milling or drilling adds labor and machine costs, and also increases quality control, inspection, and testing costs. The present novel undersea connector is inexpensive to produce since the vacuum relief channels are not formed in metal parts, thus no drilling or milling is required to facilitate vacuum relief Instead, the novel vacuum relief channels are formed in the annular seal at the time the seal is formed to significantly reduce production costs. Additionally, since the male body portion is smooth and contains no channels or ports, no sharp edges exist which rub against or contact the relatively soft elastomeric seal. Clearly, the channel in the elastomeric seal cannot damage the metal parts of the male connector. Damage can occur in prior art connectors having grooves or channels disposed in the male portion that come into contact with the elastomeric seal. According, the present undersea connector is well suited to repeated connect and disconnect operations with no degradation of the seal.

More specifically, the undersea connector of the present invention includes a pair of interconnectable male and female members where each of the members includes a body portion and a fluid valve disposed within the body portion. The male and female members cooperate with the fluid valves to actuate the valves such that the valves are placed in either an open position or a closed position to control fluid flow between the connectors. The female member has a receiving chamber for receiving the male member, and a longitudinal axis defining a direction of engagement and disengagement between the male and female members. The undersea connector includes at least one resilient annular seal in the receiving chamber for engaging the male member in sealed cooperation with the female member when the male member is received within the receiving chamber.

Additionally, a plurality of vacuum relief channels are disposed in the annular seal that permit the fluid surrounding the male and female members to pass through the vacuum relief channels to equalize pressure between the receiving chamber and the fluid surrounding the male and female members during engagement and disengagement of the male and female members.

The features of the present invention which are believed to be novel are set forth with particularity in the appended claims. The invention, together with further objects and advantages thereof, may best be understood by reference to the following description in conjunction with the accompanying drawings.

BRIEF DESCRIPTION OF THE DRAWINGS

FIG. I is a side sectional view of one embodiment of an undersea hydraulic connector of the present invention, shown in an engaged configuration.

DETAILED DESCRIPTION

Figure 1:
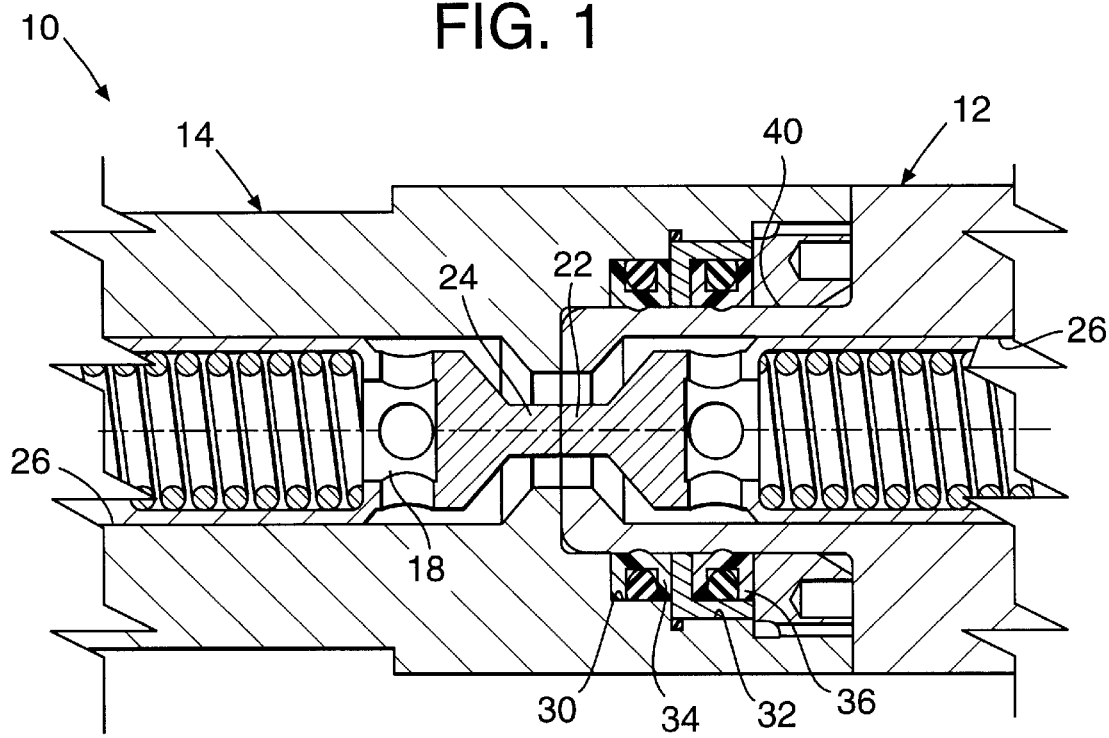
Figure 2:
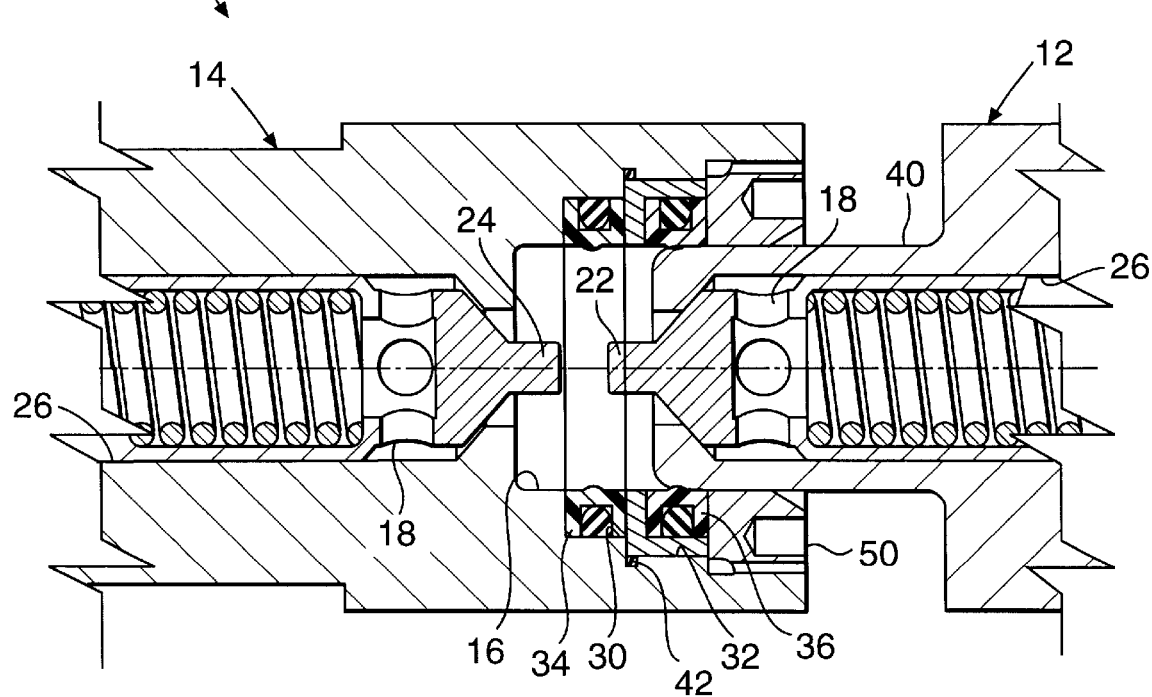
FIG. 2 is a side sectional view of the hydraulic connector of FIG. 1, shown in a partially disengaged configuration.

Referring now to FIGS. 1–2, an undersea connector 10 according to the present invention is shown. The connector 10 includes a male body portion 12, a female body portion 14, and fluid passages establishing fluid communication between the male body portion and female body portion when the male body portion is inserted into a receiving chamber 16 of the female body portion (FIG. 2). Fluid communication between the male and female body portions 12 and 14 is established when fluid valves 18 within each of the body portions are mutually engaged during the connection of the body portions. The fluid valves 18 may be poppet-type fluid valves, as is known in the art. The fluid valves 18 of the male and female body portions 12 and 14 have respective nose tips 22 and 24, and axial movement required to connect the body portions causes the nose tips to meet. When the nose tips 22 and 24 meet, the fluid valves 18 unseat under continued axial movement and move into an open position. In the open position, fluid communication is established between bores 26 of the male and female body portions 12 and 14 so that hydraulic or other fluid may be transferred through the connector 10.

The receiving chamber 16 includes first and second grooves 30 and 32 configured to receive primary and secondary annular elastomeric seals 34 and 36 to sealingly engaging an outer circumferential wall 40 of the male body portion 12 when the male body portion is inserted into the receiving chamber 16. When the male body portion 12 is received within the receiving chamber 16, the respective fluid valve nose tips 22 and 24 are urged against each other causing each fluid valve 18 to be displaced away from the opposite fluid valve, relative to the male and female body portions 12 and 14. The fluid valves 18 are spring-loaded such that axial displacement causes the fluid valves to move from a closed position to an open position to permit the flow of hydraulic or other fluid. At this time, the outer circumferential wall 40 of the male body portion 14 has established a tight and sealing fit against the primary and secondary seals 34 and 36. The fluid valves 18 move to the closed position and become sealed before the primary seal 34 is disengaged, thereby permitting connection and disconnection of the connectors with pressure in the lines.

Figure 3A:
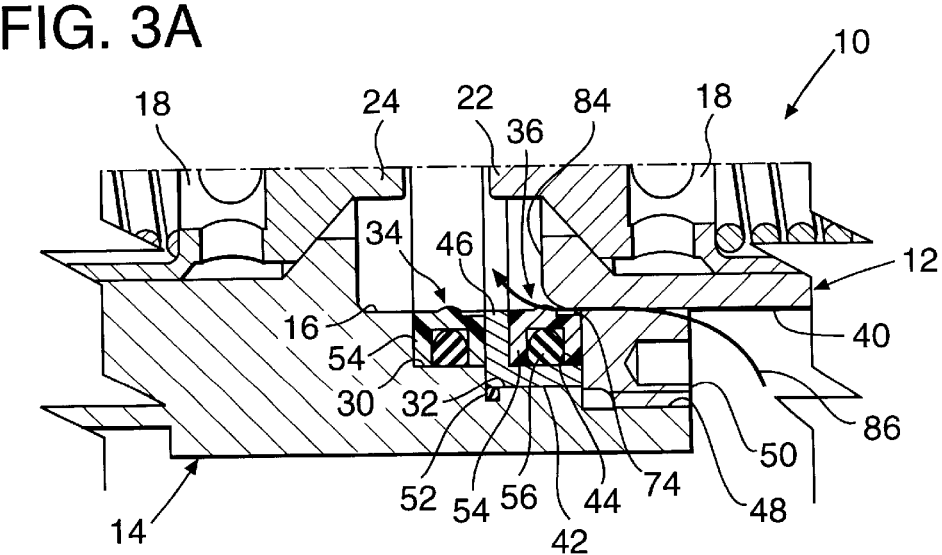
FIG. 3A is a side sectional view of the hydraulic connector of FIG. 1, particularly showing vacuum relief channels in a seal element.

Referring additionally to FIG. 3A, the diameter of groove 32 is selected to be larger than the diameter of groove 30, and an annular retainer sleeve 42 is adapted to fit within groove 32. Retainer sleeve 42 includes an inner diameter approximately equal to the diameter of groove 30 and a radially outwardly extending shoulder 46. In addition, receiving chamber 16 comprises an enlarged diameter portion 48 into which a retainer nut 50 is threadedly received. Retainer nut 50 serves to retain seal 36 in position within groove 32. Retainer nut 50 also functions to retain retainer sleeve 42 in position, which in turn retains seal 34 in position within groove 30. A seal 52 may be provided to seal between receiving chamber 16 and retainer sleeve 42. Note that two annular seals 34 and 36 are shown but a different number of seals may be used, such as a single seal or more than two seals, without affecting the operation of the connector 10.

Figure 3B:
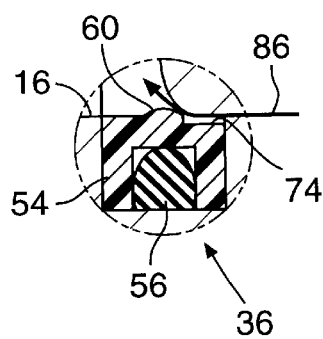
FIG. 3B is an enlarged side sectional view of the seal element of FIG. 3A.
Figure 3C:
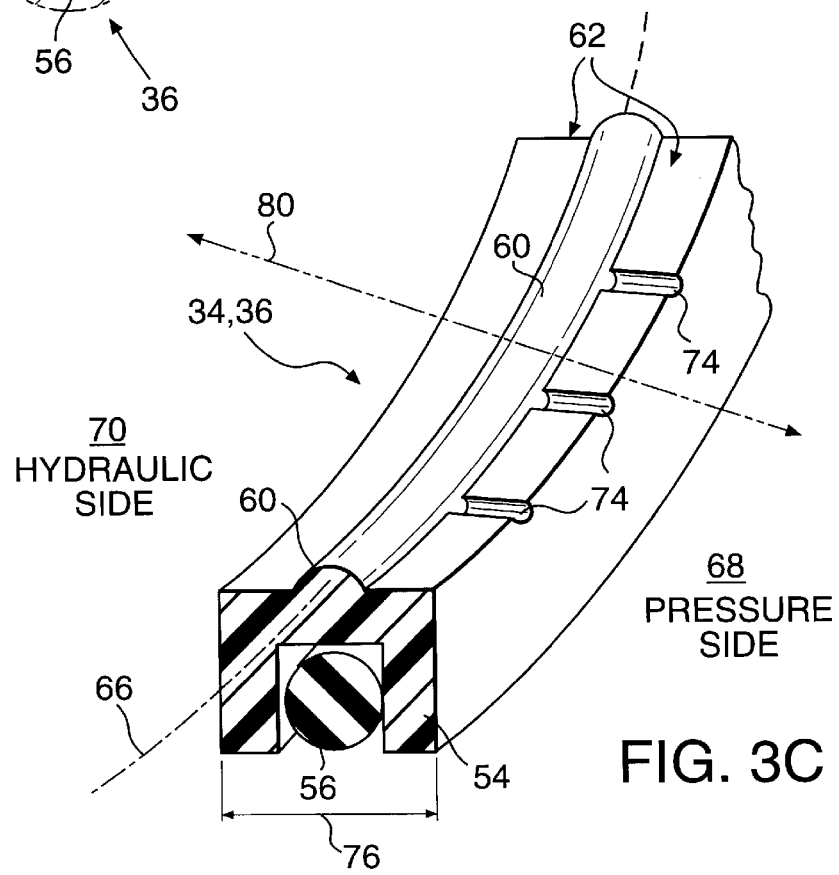
FIG. 3C is an enlarged perspective view of the seal element and vacuum relief channels of FIG. 3A.

Referring now to FIGS. 3A–3C, the first and second annular seals 34 and 36 are preferably substantially similar to each other, and a description of one will suffice to describe the other. Each annular seal 34, 36 includes a U-shaped seal element 54 and a cylindrical energizer ring 56 disposed within the U-shaped seal element. The seal element 54 and the energizer ring 56 are shown in greater detail in the enlarged views of FIG. 3B and 3C. Seal element 54 includes an annular crown 60 disposed on an inside peripheral rim 62 of the annular seal. The crown 60 is preferably convex in cross-sectional shape and projects above the peripheral rim 62. Although not specifically depicted in the figures, each annular seal 34, 36 is a continuous circular ring or donut-like structure where only a small curved segment is shown in FIG. 3C. Accordingly, the crown 60 is a continuous circular element configured to contact the outer circumferential wall 40 (FIG. 3A) of the male body portion 12 when the male body portion is inserted into the receiving chamber 16 (FIGS. 3A and 3B). The crown 60 is disposed along an imaginary circumferential centerline 66 of the peripheral rim 62 which defines a boundary separating a pressure side 68 and a hydraulic side 70 of each annular seal 34, 36. The pressure side 68 is closest to the outside of the female body portion 14 where seawater surrounds the connector 10. Conversely, the hydraulic side 70 is closest to the inside of the female body portion 14 where the fluid valves 18 (FIGS. 3A and 3B) facilitate the transport of hydraulic fluid.

The seal element 54 includes a plurality of vacuum relief channels 74 formed on the radial inside peripheral rim 62 on the pressure side of the crown 60. Preferably, the vacuum relief channels 74 are evenly distributed about the circumference of the seal element 54. However, any suitable number of vacuum relief channels 74 may be used. Additionally, although shown as having a generally cylindrical cross-sectional contour, the vacuum relief channels 74 may be flat or groove-like or may have an irregular cross sectional shape. The vacuum relief channels 74 extend along a portion of a thickness 76 of the seal element 54 defined from the crown 60 toward the pressure side 68 (FIG. 4C) of the seal element in a direction along a longitudinal axis 80. The longitudinal axis 80 defines an axis of insertion as the male body portion 12 is received within the receiving chamber 16. The vacuum relief channels 74 permit the equalization of the vacuum or pressure levels within the receiving chamber 16 during engagement and disengagement of the male and female body portions 12 and 14. This eliminates deformation and implosion of the seal element 54 during disengagement and reduces the volume of injected seawater during engagement. Note that the vacuum relief channels 74 are shown to extend or cover about one-third of the thickness 76 (FIG. 4C) of the seal element 54, but may be extended into a portion of the crown 60 to cover about one-half of the thickness 76 of the seal element.

The vacuum relief channels 74 are crucial for preventing deformation and implosion of the seal element 54 by permitting seawater surrounding the male and female body portions 12 and 14 to pass through the vacuum relief channels to equalize pressure between the receiving chamber 16 and the outside environment. In operation, during removal of the male body portion 12 from the receiving chamber 16, a high level of vacuum relative to the high external pressure is created within the receiving chamber. As the male body portion 12 is disengaged from its fully inserted position, a distal end 84 (FIG. 3A) of the male body portion 12 clears the first annular seal 34 and approaches the second annular seal 36. As the distal end 84 of the male body portion 12 contacts the crown 60 of the second annular seal 52, the level of vacuum in the receiving chamber 16 is at a maximum level since no material (fluid or seawater) is able to fill the void within the receiving chamber. Also, at this time, the outside circumferential wall 40 (FIG. 3A) of the male body portion 12 exerts force against the seal element 54 to aid in retaining the seal element 54 within the corresponding groove 32 or inner diameter portion 44 of retainer sleeve 42.

However, as the male body portion 12 slides further across the seal element 54, a smaller portion of the seal element is held in place by the male body portion 12. In such a situation, prior art annular seals tend to deform or implode at this point. However, with the present novel annular seal 36, when the male body portion 12 slides over the crown 60 and no longer contacts the top of the crown, the fluid surrounding the male and female body portions 12 and 14 is able to pass through the vacuum relief channels 74 and into the receiving chamber 16, as shown by arrow 86 in FIGS. 3A and 3B. This occurs because the crown 60 and the outer circumferential wall 40 no longer provide a barrier against the seawater. Essentially, the vacuum relief channels 74 provide a pathway for fluid to enter and exit the receiving chamber 16. Since seawater flows into the receiving chamber 16 during disengagement, the level of vacuum is reduced to near zero and the pull or deforming force acting on the seal element 54 is substantially reduced. Accordingly, the second annular seal 36 remains properly seated in the second groove 32 (or the inner diameter portion 44 of retainer sleeve 42) during disengagement of the male body portion 12 from the female body portion 14.

The above-described operation occurs in reverse with respect to insertion of the male body portion 12 into the receiving chamber 16. During insertion of the male body portion 12, seawater is present within the receiving chamber 16 since it is essentially open to the external environment. Insertion of the male body portion 12 creates a high pressure level within the receiving chamber 16 tending to force the trapped seawater into the hydraulic line through the fluid valves 18. As the male body portion 12 is further inserted into the female body portion 14, the distal end 84 (FIG. 4A) of the male body portion 12 approaches the second annular seal 36. As the distal end 84 of the male body portion 12 contacts the second annular seal 36 and moves further inward toward the crown 60 of the second annular seal, seawater is ejected out of the receiving chamber 16 through the vacuum relief channels 74. This reduces the pressure level of the trapped seawater within the receiving chamber 16 and also reduces the total volume of the trapped seawater. Accordingly, only a reduced volume of trapped seawater remains. Once the distal end 84 of the male body portion 12 contacts the crown 60, the vacuum relief channels 74 become blocked and no further seawater can be ejected. Thus, not all of the trapped seawater can be ejected.

The seal element 54 is preferably formed from resilient material that is tolerant of multiple connections and disconnections of the male and female body portions 12 and 14 such that the connector 48 may undergo repeated operations. Additionally, resilient material is resistant to leakage of low viscosity fluids, such as methanol and water-based hydraulic fluids, and also forms a tight seal even if the male body portion 12 has surface imperfections that would otherwise prevent formation of a proper metal-to-metal seal. The seal element 54 is preferably formed from Polytetraflourethylene ("PTFE⇋") with glass filling or a thermoplastic elastomer, while the energizer ring 56 is preferably formed from fluorocarbon rubber.

Figure 4A:
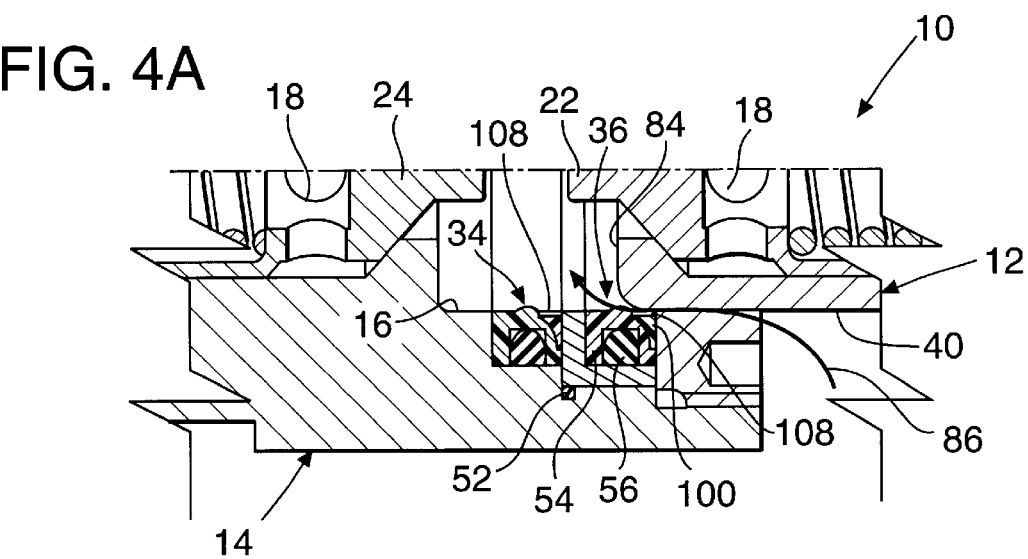
FIG. 4A is a side sectional view of an alternate embodiment of an undersea hydraulic connector according to the present invention, particularly showing a seal element with a pressure-side back-up ring having vacuum relief channels.
Figure 4B:
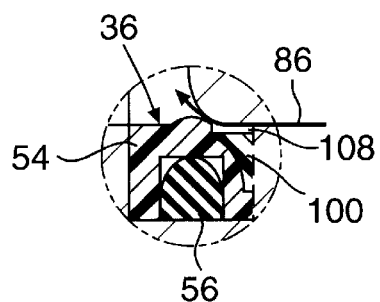
FIG. 4B is an enlarged side sectional view of the seal element and the pressure-side back-up ring of FIG. 4A.
Figure 4C:
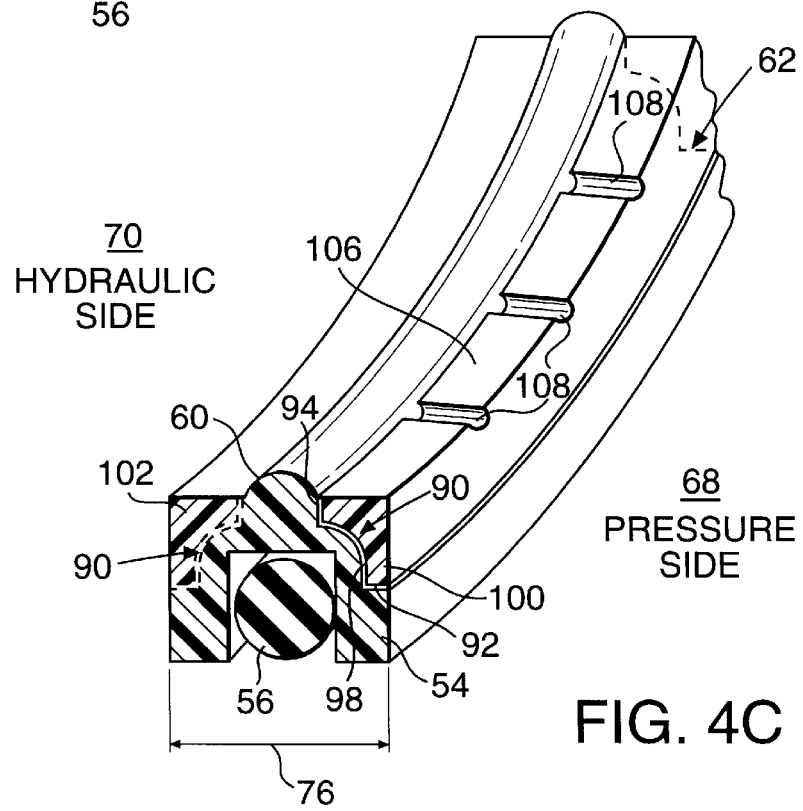
FIG. 4C is an enlarged perspective view of the seal element and the pressure-side back-up ring of FIG. 4A.

Referring to FIGS. 4A–4C, an alternate embodiment of connector 10 is shown where FIG. 4C illustrates particular details of the invention. Like reference numerals are used to identify like structures. The seal element 54 according to this embodiment includes a corner portion 90 (FIG. 4C) cut away along an edge of the inside peripheral rim 62. The corner portion 90 is continuous about the inner circumference of the seal element 54 since the seal element is also in the form of a continuous ring or donut shape with a U-shaped cross-section. Alternately, each opposite edge of the seal element 54 may have the corner 90 (FIG. 4C) portion cut away such that both the hydraulic side 70 and the pressure side 68 (FIG. 4C) of the seal element may be cut away. The cut away corner portion 90 is not a simple diagonal slice, but rather, forms an outer annular shoulder 92, an inner annular shoulder 94, and a curved annular surface portion 98 between the two shoulders (FIG. 4C).

A back-up ring 100 is configured to engage the cut away corner portion 90 on the pressure-side of the seal element 54 and has a cross-sectional contour that is essentially a "mirror image" of the cross-sectional contour of the cut away corner portion. Accordingly, the back-up ring 100 forms an exact fit with the cut away corner portion 90. An inside surface 106 (FIG. 4C) of the back-up ring 100 is configured to engage the outer circumferential surface 40 (FIG. 4A) of the male body portion 12 when the male body portion is received by the receiving chamber 16. Note that one or two individual back-up rings may exist--one back-up ring 100 disposed on the pressure side 68 of the seal element 54, and another back-up ring 102 alternately or simultaneously disposed on the hydraulic side 70 of the seal element. The back-up rings 100 and 102 are separate elements in the seal assembly.

Figure 5A:
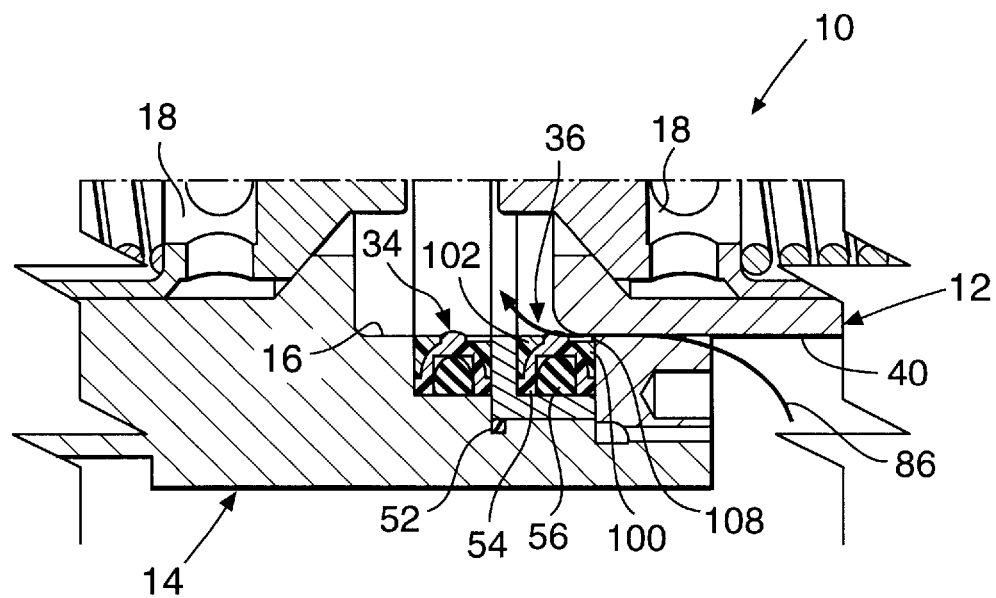
FIG. 5A is a side sectional view of an alternate embodiment of an undersea hydraulic connector, according to the present invention, particularly showing a seal element and two back-up rings with vacuum relief channels disposed on the pressure-side of the back-up rings.
Figure 5B:
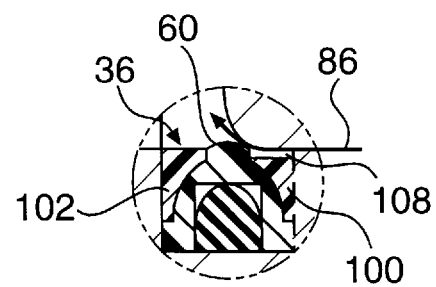
FIG. 5B is an enlarged side sectional view of the seal element and back-up rings of FIG. 5A.

FIGS. 5A and 5B illustrate the pressure side back-up ring 100 and the hydraulic side back-up ring 102 simultaneously disposed on the seal element 54 on opposite sides of the crown 60, while FIG. 4C illustrates that one or both of the back-up rings may be present. In the alternate embodiments of FIGS. 4A–4C or FIGS. 5A–5B, the seal element 54 does not include the vacuum relief channels 74 of FIGS. 3A–3C, but rather, the pressure side backup ring 100 incorporates a plurality of vacuum relief channels 108. The vacuum relief channels 108 disposed on the pressure side back-up ring 100 have a similar form and serve a similar purpose as the vacuum relief channels 74 shown in FIGS. 3A–3C.

The back-up rings 100 and 102 in each alternate embodiment are preferably formed from a stronger material than the material from which the seal element 54 is formed, such as Polyetheretherketone ('PEEK"). However, any suitably strong plastic, elastomeric or other material may be used. The back-up rings 100 and 102 significantly reduce or prevent deformation of the annular seals 34, 36, particularly in deep water where the external pressure upon disconnection is great.

It should be noted that the hydraulic-side back-up ring 102 does not include the vacuum relief channels 108 because the crown 60 would block any fluid transfer. It should also be noted that when both the first and second annular seals 34 and are utilized within the receiving chamber 16, the vacuum relief channels 108 of the first annular seal 34 are not functional when both seals are working perfectly. However, in case one of the seals has developed a leak, then these channels will also protect against the implosion of the first annular seal as well. It should further be noted that the hydraulic side back-up ring 102 is particularly useful in preventing deformation of the seal element 54 since it is the hydraulic side of the seal element that is particularly susceptible to deformation during disengagement of the male body portion 12.

Specific embodiments of an undersea hydraulic connector having pressure equalization according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A hydraulic coupling comprising:
   a pair of interconnectable male and female members, each of the members having a body portion and a fluid valve disposed within the body portion, the male and female members cooperating with the fluid valves to actuate the valves such that the valves are placed in one of an open position and a closed position to control fluid flow therebetween;
   said female member having a receiving chamber for receiving the male member, and a longitudinal axis defining a direction of engagement and disengagement between the male and female members;
   at least one annular seal in the receiving chamber for engaging the male member in sealed cooperation with the female member when the male member is received within the receiving chamber; and
   at least one vacuum relief channel disposed in the annular seal, the vacuum relief channel permitting a fluid surrounding the male and female members to pass through the at least one vacuum relief channel to equalize pressure between the receiving chamber and the fluid surrounding the male and female members during engagement and disengagement of the male and female members.

2. The coupling according to claim 1, wherein the annular seal includes an annular crown disposed on an inside peripheral rim of the annular seal, the crown projecting above the peripheral rim and substantially disposed along a circumferential centerline of the peripheral rim, said centerline defining a boundary separating a pressure side and a hydraulic side of the annular seal, the crown configured to engage an outer circumferential surface of the male member when the male member is received by the receiving chamber.

3. The coupling according to claim 2 wherein the at least one vacuum relief channel includes a plurality of vacuum relief channels disposed about the inside peripheral rim.

4. The coupling according to claim 3 wherein the plurality of vacuum relief channels extend along a portion of a thickness of the annular seal defined from the crown toward the pressure side of the annular seal in a direction parallel to the longitudinal axis.

5. The coupling according to claim I wherein the fluid surrounding the male and female members passes through the at least one vacuum relief channel and into the receiving chamber as the male member is displaced from an engaged position within the receiving chamber to a disengaged position, the passing of the fluid into the receiving chamber operative to equalize the pressure between the receiving chamber and the surrounding fluid.

6. The coupling according to claim 1 wherein fluid present within the receiving chamber passes through the at least one vacuum relief channel and into the fluid surrounding the male and female members as the male member is received into the receiving chamber, the passing of the fluid operative to reduce an amount of water trapped within the receiving chamber during engagement of the male member with the female member.

7. The coupling according to claim 2 wherein the male and female members are interconnected by inserting the male member into the receiving chamber, the male member first engaging the pressure side of the annular seal, then engaging the crown, and then engaging the hydraulic side of the annular seal, said interconnection operative to urge the fluid valves into the open position to facilitate a flow of hydraulic fluid between the valves in the male and female members.

8. The coupling according to claim 1 further including a second annular seal disposed in the receiving chamber proximal the at least one annular seal, the second annular seal disposed in a parallel spaced orientation relative to the at least one annular seal.

9. A hydraulic coupling comprising:
   a pair of interconnectable male and female members, each of the members having a body portion and a fluid valve disposed within the body portion, the male and female members cooperating with the fluid valves to actuate the valves such that the valves are placed in one of an open position and a closed position to control fluid flow therebetween;
   said female member having a receiving chamber for receiving the male member and a longitudinal axis defining a direction of engagement and disengagement between the male and female members;
   a least one annular seal in the receiving chamber for engaging the male member in sealed cooperation with the female member when the male member is received within the receiving chamber;

an annular crown disposed on an inside peripheral rim of the annular seal, the crown projecting above the peripheral rim and substantially disposed along a circumferential centerline of the peripheral rim, said centerline defining a boundary separating a pressure side and a hydraulic side of the annular seal;

the annular seal having at least one corner portion cut away along an edge of the inside peripheral rim forming at least one annular shoulder;

a back-up ring configured to engage the cut away corner portion along the edge of the inside peripheral rim, the back-up ring configured to engage the at least one annular shoulder; and the back-up ring including at least one vacuum relief channel, the vacuum relief channel permitting a fluid surrounding the male and female members to pass through the vacuum relief channel to equalize pressure between the receiving chamber and the fluid surrounding the male and female members during engagement and disengagement of the male and female members.

10. The coupling according to claim 9 wherein the annular seal includes a first and a second cut away corner portion formed along the inside peripheral rim such that the first and second cut away corner portions are disposed on opposite edges of the peripheral rim with the crown disposed therebetween.

11. The coupling according to claim 10 further including a first and a second back-up ring configured to engage the first and second cut away corner portions, respectively, at least one of said first and second back-up rings configured to prevent deformation of the annular seal during disengagement of the male member from the receiving chamber.

12. The coupling according to claim 9 wherein the back-up ring is bonded to the annular seal.

13. The coupling according to claim 9 wherein the at least one vacuum relief channel includes a plurality of vacuum relief channels disposed about the back-up ring.

14. The coupling according to claim 9 wherein the at least one vacuum relief channel extends along a portion of a thickness of the back-up ring defined from the crown of the annular seal toward the pressure side of the annular seal in a direction parallel to an axis of insertion of the male and female members.

15. The coupling according to claim 9 wherein the fluid surrounding the male and female members passes through the at least one vacuum relief channel and into the receiving chamber as the male member is displaced from an engaged position within the receiving chamber to a disengaged position, the passing of the fluid into the receiving chamber operative to equalize the pressure within the receiving chamber with the pressure of the surrounding fluid.

16. The coupling according to claim 9 wherein fluid present within the receiving chamber passes through the at least one vacuum relief channel and into the fluid surrounding the male and female members as the male member is received in the receiving chamber, the passing of the fluid operative to reduce the amount of water trapped within the receiving chamber during engagement of the male member with the female member.

17. A seal for a hydraulic coupling, the coupling including a pair of interconnectable male and female members, each of the members having a body portion and a fluid valve disposed within the body portion, the female member having a receiving chamber for receiving the male member, the seal comprising:

a least one pliable annular seal element disposed in the receiving chamber and configured to engage the male member in sealed cooperation with the female member when the male member is received within the receiving chamber;

the annular seal element having at least one corner portion cut away along an edge of the inside peripheral rim forming at least one annular shoulder;

a back-up ring configured to engage the cut away portion along the edge of the inside peripheral rim, the back-up ring configured to engage the at least one annular shoulder; and the back-up ring including at least one vacuum relief channel, the vacuum relief channel permitting a fluid surrounding the male and female members to pass through the vacuum relief channel to equalize pressure between the receiving chamber and the fluid surrounding the male and female members during engagement and disengagement of the male and female members.

18. The seal according to claim 17, wherein the seal element includes an annular crown disposed on an inside peripheral rim of the seal element, the crown projecting above the peripheral rim and substantially disposed along a circumferential centerline of the peripheral rim, said centerline defining a boundary separating a pressure side and a hydraulic side of the annular seal, the crown configured to engage an outer circumferential surface of the male member when the male member is received by the receiving chamber.

19. The seal according to claim 17 wherein the at least one vacuum relief channel extends along a thickness of the back-up ring, and is defined to extend from the crown of the seal element toward the pressure side of the annular seal in a direction parallel to an axis of insertion of the male and female members.

20. A seal for a hydraulic coupling, the coupling including a pair of interconnectable male and female members, each of the members having a body portion and a fluid valve disposed within the body portion, the female member having a receiving chamber for receiving the male member, the seal comprising:

a least one pliable annular seal element disposed in the receiving chamber and configured to engage the male member in sealed cooperation with the female member when the male member is received within the receiving chamber; and at least one vacuum relief channel disposed in the annular seal element the at least one vacuum relief channel permitting a fluid surrounding the male and female members to pass through the vacuum relief channel to the receiving chamber to equalize pressure between the receiving chamber and the fluid surrounding the male and female members during engagement and disengagement of the male and female members.

* * * * *